Figure 1:
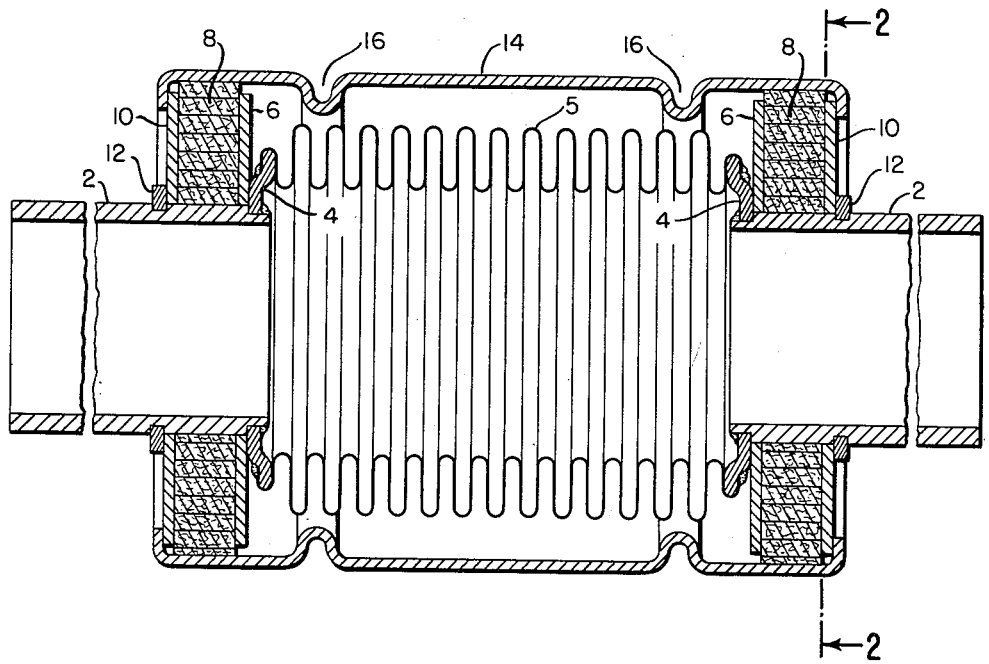

Nov. 20, 1956   F. W. HOTTENROTH, JR   2,771,311
BELLOWS EXPANSION JOINT WITH SEALED CASING
Filed March 4, 1953

INVENTOR.
FREDERICK W. HOTTENROTH, JR.

ATTORNEYS

United States Patent Office 2,771,311
Patented Nov. 20, 1956

2,771,311
BELLOWS EXPANSION JOINT WITH SEALED CASING

Frederick W. Hottenroth, Jr., Newton, Mass., assignor to Standard-Thomson Corporation, Boston, Mass., a corporation of Delaware Application March 4, 1953, Serial No. 340,211

2 Claims. (Cl. 285—299)

The present invention relates to expansion joints for fluid pipes, and more particularly to an improved bellows type expansion joint having provision to prevent excessive leakage of fluid in case of rupture of the bellows.

One of the many uses of metallic bellows has been to provide axially flexible connections between pipes which, by reason of vibration, thermal effects or other causes, would tend to buckle, and to distort or stress their supports or other associated parts, if rigidly secured together. The usual procedure has been to secure the ends of the bellows directly to the ends of the pipes in a fluid-tight manner, whereby the bellows becomes a part of the conduit.

Certain problems arise in the employment of this type of flexible connection. For example, provision for protecting the bellows from dust, dirt, moisture and damage from external sources is often necessary. For this purpose use has been made of a protective sleeve surrounding the bellows, the sleeve being slidably supported at each end upon the ends of the joined pipes. This arrangement does not fully seal the bellows from external moisture, since leakage may occur between the sliding surfaces. Ordinarily, if the latter were made sufficiently tight fitting to insure an effective fluid seal, the flexibility of the connection would be impaired by the introduction of substantial friction opposing axial movement.

Another problem, which is particularly acute in heating systems, is the danger of leakage and possible flooding and loss of fluid resulting from rupture of the bellows due to fatigue failure or the like. In heating systems the pipes are frequently subjected to rapid temperature changes, as by turning on, throttling, or shutting off the flow of fluid, or by changes in the temperature of the fluid. These changes may occur with varying degrees of amplitude, at varying frequencies, and at any time, according to the needs of the system. Thus, it is usually impossible to predict when the bellows might fail through fatigue. Moreover, it is obvious that continual visual supervision of the condition of each joint may be impracticable or impossible because of inaccessibility, as in certain aircraft installations, or for other reasons. The results of leakage may be extremely damaging, costly, and even dangerous in many instances, unless the leakage is promptly detected and remedied.

Based upon the foregoing considerations, it is a principal object of the present invention to provide a safe bellows type expansion joint having the familiar advantages of such joints.

Another important object is to make provision in the construction of such a joint for supervisory control in the event of fluid leakage, the control having no appreciable effect upon the characteristics of the bellows joint under normal operating conditions.

With the above objects in view, an important feature of the invention consists in the use of a supervisory seal provided by a pair of fiber washers at either end of a metal jacket, sleeve, or closure surrounding the bellows. The washers permit free relative motion of the joined pipe ends under normal conditions, but swell up and expand radially upon contact with leaking fluid to seal the ends of the jacket or closure against the pipes. Thus, the jacket or closure is adapted to perform the dual functions of protecting the bellows externally and sealing the joint against excessive leakage of fluid in event of fatigue failure of the bellows, or rupture from any other cause.

According to another feature, the fiber washers are layer wound to a diameter permitting the necessary clearance for frictionless sliding when dry, and causing sufficient radial expansion when wet to form an efficient seal automatically and without the need for visual supervision or human intervention in any form.

Other features relate to details of construction and resultant characteristics of performance hereinafter more fully described and specifically defined in the claims.

Figure 2:
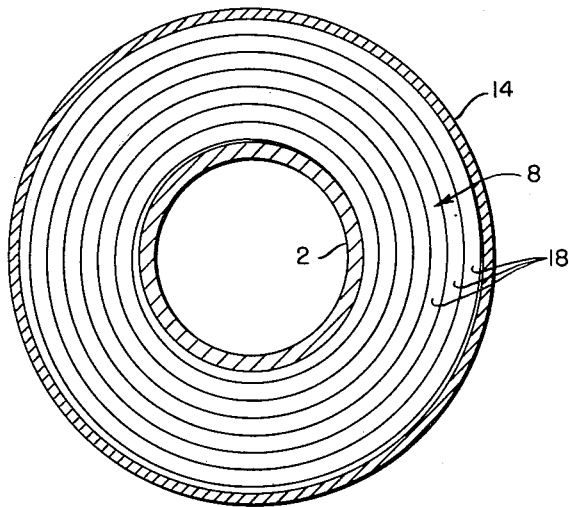

In the drawings,

Fig. 1 is a longitudinal elevation in section through the central axis of a preferred embodiment of the invention; and Fig. 2 is an end elevation thereof in section on line 2—2 of Fig. 1.

Referring to Fig. 1, the flexible joint is preferably constructed between two stud pipes 2, of a suitable diameter to be joined rigidly in any desired manner with the ends of the conduit pipes to be connected. The first step is preferably to secure rings 4 to the stud pipes, as by soldering them in annular recesses in the ends of the pipes as shown in the drawing.

Next, the ends of a suitable metallic bellows 5, of appropriate diameter in relation to the diameter of the stud pipes, are secured over the rims of the end rings 4, and preferably soldered to provide an effective fluid seal.

Next, a pair of metallic retaining washers 6 are received over the ends of the stud pipes so as to abut against the sides of the end rings 4. These are followed by fiber washers 8, hereinafter more fully described, and then by another pair of metallic retaining washers 10. The three washers on each side of the bellows are then held securely in position by suitable retaining rings 12. It will be noted that according to this construction no sliding may take place between the washers and the stud pipes at any time.

A tubular closure is next formed around the bellows and washers by receiving a metallic cylinder 14 of suitable diameter over one end of the assembly, the cylinder having annular rolls 16 formed therein, and the ends of the cylinder are then spun downwardly over the outer metallic retaining washers 10.

It will be apparent, therefore, that the assembly as shown in Fig. 1 represents the maximum working length of the expansion joint. Also, if the joint is to be flexible, it is apparent that the surface of contact between the fiber washers 8 and the closure 14 must permit free sliding over some appreciable axial distance. This establishes the minimum working length of the expansion joint as that length to which the bellows is compressed when the retaining washers 6 abut against the rolls 16 on each side. Thus, the principal function of the rolls 16 is to establish a minimum working length. The exact positions of these rolls with respect to the ends of the closure 14 are therefore a function of the properties of the bellows, and must be such as to prevent damage to the bellows through excessive compression.

As shown in Fig. 2, the fiber washers 8 are preferably constructed by layer winding, whereby each of the roughly concentric laminae 18 represents a thickness of the fiber, and the principal dimension in which swelling occurs upon contact with moisture is radial. Under normal operating conditions, as above indicated, the diameter of the fiber washers permits free sliding thereof within the closure 14. Thus, the closure 14 is continuously effective to protect the exterior of the bellows from dust, dirt, damage, and even moisture except in cases of extreme external dampness.

In case of rupture of the bellows or leakage around the ends thereof adjacent to the end rings 4, fluid enters the space between the bellows and the closure 14 and eventually reaches the washers 8, whereupon it swells the washers and causes them to expand against the closure 14. Once the washers have expanded, further leakage of fluid to the outside of the closure is effectively prevented.

The above supervisory control over fluid leakage is entirely automatic, and requires no intervention or adjustment. The effect of the fluid seal is to increase greatly the force necessary to move the joint axially through its stroke, but by proper design it is possible to allow for continued operation of the joint with a sliding seal on the fiber. Thus, the joint would not become completely rigid when the washers are expanded. It has been found in tests that axial movement of the joint under these conditions produces considerable noise, which is useful in that it serves as a warning that replacement is required. Until such replacement is made, the worst that can happen is that the washers will ultimately become worn. But, the leakage resulting from such wear will be of minor importance compared with the leakage which would occur if the bellows were not sealed.

Arrangements may be made for periodically inspecting the expansion joints at convenient times to determine whether they remain flexible, or require replacement and repair. In cases requiring full flexibility of the joints at all times, even in event of such rupture, expansion joints of this improved construction may be connected in series, each joint being capable, if required, of operating through the full axial working range required for the connection. It is extremely unlikely that two such joints would fail through fatigue before failure of either one of them is detected.

It will be observed that other modifications of the structure may be made for the purpose of increasing the flexibility in the joint after rupture of the bellows and the ensuing sealing action of the fiber washers. To this end the rolls 16 in the closure 14 may be formed of appropriate curvature, and the walls of the cylinder of sufficient flexibility, to cause the central portion of the closure to bellow outwardly under axial compression to some appreciable extent. If greater flexibility is desired, it is also possible to form the closure 14 with a number of bellows folds in the region between the washers. Thus, depending upon the specific requirements, it is possible to prevent leakage in event of rupture of the bellows, while yet permitting various degrees of continued flexibility of the connection.

It will be understood that the invention has been described with reference to a preferred embodiment, and that the modifications of structure and design heretofore mentioned, as well as others which will occur to those skilled in the art, may be made without departing from the spirit or scope of the invention.

Having thus described the invention, I claim:

1. An expansion joint for a fluid conduit comprising, in combination, an expansible bellows, a pair of tubular members joined to the ends of the bellows, a fiber washer surrounding each of said tubular members adjacent an end of the bellows, said washers being formed of annular laminae of fibrous composition adapted to expand radially upon contact with the fluid in the conduit, and a tubular closure surrounding the bellows and washers, said closure being freely slidable over the washers when the washers are dry, whereby upon occurrence of a leak in the bellows, the washers are exposed to the fluid and expand to form seals with the closure.

2. An expansion joint for a fluid conduit comprising, in combination, an expansible bellows, a pair of tubular members joined to the ends of the bellows, a fiber washer surrounding each of said tubular members adjacent an end of the bellows, said washers being formed of annular laminae of fibrous composition adapted to expand radially upon contact with the fluid in the conduit, means to constrain the washers against sliding longitudinally on said tubular members, and a tubular closure surrounding the bellows and enclosing the washers, said closure being freely slidable over the washers when the washers are dry, whereby upon occurrence of a leak in the bellows, the washers are exposed to the fluid and expand to form seals with the closure.

References Cited in the file of this patent

UNITED STATES PATENTS

| 337,434 | Rankin | Mar. 9, 1886 |
| 2,342,398 | Heron | Feb. 22, 1944 |
| 2,493,404 | Haynes | Jan. 3, 1950 |
| 2,520,089 | Lippincott | Aug. 22, 1950 |

FOREIGN PATENTS

| 637,122 | Great Britain | May 10, 1950 |